United States Patent [19]

Sangster

[11] 3,918,081

[45] Nov. 4, 1975

[54] INTEGRATED SEMICONDUCTOR DEVICE EMPLOYING CHARGE STORAGE AND CHARGE TRANSPORT FOR MEMORY OR DELAY LINE

[75] Inventor: Frederik Leonard Johan Sangster, Eindhoven, Netherlands

[73] Assignee: U.S. Philips Corporation, New York, N.Y.

[22] Filed: Aug. 19, 1971

[21] Appl. No.: 173,249

Related U.S. Application Data

[63] Continuation of Ser. No. 817,690, April 21, 1969, abandoned.

[30] Foreign Application Priority Data

Apr. 23, 1968 Netherlands ........................ 6805705

[52] U.S. Cl. .............. 357/24; 307/221 D; 307/304; 357/14; 357/22; 357/23; 357/41

[51] Int. Cl.²H01L 27/10; H01L 29/76; H03k 21/00; H03K 23/00

[58] Field of Search ........ 307/221 R, 221 C, 221 D, 307/304; 357/22, 23, 24, 41, 14

[56] References Cited

UNITED STATES PATENTS

| | | | |
|---|---|---|---|
| 2,991,374 | 7/1961 | DeMiranda et al. | 357/24 |
| 3,387,286 | 6/1968 | Dennard | 357/24 |
| 3,390,273 | 6/1968 | Weckler | 357/24 |
| 3,402,355 | 9/1968 | Hannan et al. | 307/221 D |
| 3,407,341 | 10/1968 | Franks | 357/24 |
| 3,471,711 | 10/1969 | Poschenrieder et al. | 357/24 |
| 3,474,260 | 10/1969 | Frohbach | 307/221 D |
| 3,546,490 | 12/1970 | Sangster | 357/24 |
| 3,621,283 | 11/1971 | Teer et al. | 357/24 |
| 3,651,349 | 3/1972 | Kahng et al. | 357/24 |
| R27,775 | 10/1973 | Lehovec | 357/24 |

*Primary Examiner*—William D. Larkins
*Attorney, Agent, or Firm*—Frank R. Trifari; Jack Oisher

[57] ABSTRACT

Integrated semiconductor device for use as a delay line or memory, for example a shift register, is described. In this device, charge is stored in surface regions of a semiconductor to represent signal levels. The stored charge may be shifted to other memory locations by establishing a charge transfer path in the semiconductor by means of a field induced channel. Charge transfer in undesirable paths is prevented by turning-off adjacent channels. Insulated gate or junction field effect transistor structures may be employed to turn on desired charge transfer paths.

45 Claims, 17 Drawing Figures

INVENTOR.
FREDERIK L. J. SANGSTER

BY

AGENT

INVENTOR.
FREDERIK L. J. SANGSTER
BY
AGENT

INVENTOR.
FREDERIK L. J. SANGSTER
BY
AGENT

INVENTOR.
FREDERIK L. J. SANGSTER
BY
AGENT

INTEGRATED SEMICONDUCTOR DEVICE EMPLOYING CHARGE STORAGE AND CHARGE TRANSPORT FOR MEMORY OR DELAY LINE

This is a continuation of application Ser. No. 817,690, filed Apr. 21, 1969, now abandoned.

The invention relates to a circuit arrangement for transferring charge from a first capacitance to a second capacitance by means of electronic switching means. This type of circuit arrangement is frequently used in capacitor memories which may be used, for example, as a delay line for audio frequency or video frequency signals, or as a binary shift register. It is then necessary for the energy in a first capacitance to be transferred to a second capacitance in the said memory circuit with as little loss and distortion as possible.

In a known circuit arrangement of this kind as shown in FIG. 1*a* of "Electronics Letters", December 1967, 3, nr. 12, pp.544–546, the series arrangement of a resistor, the emitter collector path of a transistor and a diode has been included between a first capacitance and a second capacitance, a switching source which controls the transfer of charge being provided between the connection ends of the first and the second capacitance remote from the resistor and the diode. The base electrode of the said transistor is connected to a point of constant potential. This known circuit arrangement suffers from the disadvantage that cross-talk occurs between sucessive signal samplings which is caused by the presence of the stray capacitance between the collector and the base of the transistors, which has for its result that during the transfer of charge from a first capacitance to a second capacitance, a part of the charge to be transferred appears in the said stray capacitance as a stray charge, which charge remains in the stray capacitance during the transfer operation from the second capacitance to a third capacitance. This stray charge is applied extra to the said second capacitance in the subsequent transfer operation from the said first capacitance to the said second capacitance. The result of this is that echoes of the preceding signal sampling are superimposed upon the individual signal samplings, said echo effect having a cumulative action. In an integrated memory in circuit in which the ratio between the said stray capacitance and the memory capacitance cannot be chosen to be small, said echo effect will already be disastrous for the usability of the integrated memory with a small number of memory units arranged one behind the other.

Another disadvantage of the known circuit is the fact that loss of charge occurs in that the collector-emitter current gain factor $\alpha$ of the transistors used is slightly lower than 1, so that the charging current and discharging current, respectively, of a first capacitance is larger than the discharging current and charging current, respectively, of a second capacitance.

It is the object of the invention to provide a circuit arrangement of the type described, which does not have the said disadvantages and is in addition extremely suitable to be integrated. The invention is characterized in that a field effect transistor is arranged between the said first and said second capacitances, the first capacitance being included in the source electrode circuit and the second capacitance being included in the drain electrode circuit, a switching voltage source which controls the transfer of charge being arranged between the gate electrode of the field effect transistor and the connection of the said first capacitance remote from the source electrode, the connection of the said second capacitance remote from the drain electrode being connected to the gate electrode of the field effect transistor.

The circuit arrangement is preferably used in a capacitor memory, said memory comprising successive circuits built up in the same manner so that in successive stages the second capacitance of the first stage also is the first capacitance of the second stage and the second capacitance of the second stage is also the first capacitance of the third stage, and so on.

The invention furthermore relates to a semiconductor device for use in such a circuit which semiconductor device comprises a substrate which shows one or more surface regions of a semiconductor material. According to the invention such a device is characterized in that the field effect transistors of the device constitute a series, the semiconductor regions of field effect transistors of the series being arranged in the said surface regions, the drain electrode of a field effect transistor of the series for transferring charge being connected to the source electrode of the subsequent field effect transistor of the series, the capacitance in the drain electrode circuit of each field effect transistor being constituted by the internal capacitance between the gate electrode and the drain electrode of said field effect transistor, the gate electrode of the field effect transistors being associated with the electric input(s) for the control signals.

By using the internal capacitance between the gate and drain electrodes as second capacitance, so as a memory or storage capacitance, a capacitor memory with a very simple structure is obtained, which memory combines a good action with a small required surface area per memory unit, because every memory unit is constituted by only one field effect transistor. Furthermore it is of importance that the surface area per memory unit in a memory according to the invention generally is smaller than that in a comparable integrated memory in which bipolar transistors are used, because when field effect transistors are used, these can be provided in the same surface region so that the use of insulation regions can be avoided. Moreover, the use of field effect transistors in manufacturing an integrated memory according to methods commonly used in semiconductor technology may result in a decrease of the number of photoresist and diffusion operations as compared with the use of bipolar transistors. Both the smaller surface area per memory unit and the simpler manufacture increase the efficiency of manufacture.

In addition the construction chosen of a capacitor memory shown in FIG. 3 when the internal capacitance between the gate and drain electrodes is used as a memory capacitance, has the additional advantage that the stray capacitance present between the source and gate electrodes has no harmful influence on a satisfactory operation of the said capacitor memory because said stray capacitance also serves as a memory capacitance. The same reasoning applies to the stray capacitances between the surrounding semiconductor surface region and the source and drain electrodes. The reference level of the stray capacitance between the source and gate electrodes is equal to $-V_D$ volt.

The circuit arrangement according to the invention may be used inter alia as a delay line, for example, audio frequency or video frequency signals. In such a circuit a large delay time per memory unit, so per field effect transistor, is desirable. When a series of $n$ field effect transistors is used, a maximum delay time per memory unit can be obtained when all the gate electrodes are connected separately, through a switching voltage source, to earth or a different reference potential. By choosing the switching signals to be so as to have a value of E volt during $1/n$ part of each scan period T and a value 0 volt during the rest of the period, and when in addition they are shifted in time relative to each other by $1/n$ part of the period T in such manner that first the $n^{th}$ field effect transistor and then the $(n-1)^{th}$, $(n-2)^{th}$, and so on, becomes conductive, the delay time per memory unit becomes maximum and equal to $$\frac{(n-1)}{n}$$

T seconds.

In practice, however, the number of required switching sources will preferably be restricted at the expense of some reduction of the delay time per memory unit. This can be achieved by interconnecting a number of gate electrodes of field effect transistors and a preferred embodiment of the semiconductor device according to the invention is therefore characterized in that a number of gate electrodes of field effect transistors of the series are interconnected, said number containing no two succeeding field effect transistors.

It will be obvious that a compromise which is as favorable as possible is desirable between the number of switching sources to be used on the one hand and the number of required field-effect transistors on the other. In this case it is of importance that the delay time per memory unit furthermore is independent of the manner in which the connections of the gate electrodes of various field effect transistors of the series have been chosen.

Although for the operation as a shift register it is sufficient if in the connection of gate electrodes of various field effect transistors the condition is satisfied that two succeeding field effect transistors cannot simultaneously be conductive, larger memories according to the invention are constructed, so as to obtain a favorable compromise, from a series of field effect transistors which contains at least two succeeding adjacent groups having the same number of succeeding field effect transistors, the gate electrodes of said field effect transistors which are associated with different groups but in their group have the same number, being interconnected.

This construction enables the realization of the largest possible delay time per memory unit with a previously adjusted or chosen number of switching sources to be used. The number of field effect transistors per group is determined by the number of switching sources to be used.

The semiconductor device according to the invention may be constructed with thin film transistors (T.F.T's) but is preferably characterized in that the source and drain electrodes of one or more field effect transistors of the series are surface regions, while between said surface regions a channel region extends which adjoins the semiconductor surface which is bounded by the surface regions, an insulating layer being provided on the semiconductor surface on which layer the gate electrode is provided which extends above the channel region.

An important embodiment of the semiconductor device according to the invention comprises at least one field effect transistor having an insulated gate electrode, the drain electrode of which also constitutes the source electrode of the succeeding field effect transistor of the series so that a particularly compact structure is obtained.

A further important embodiment of the semiconductor device according to the invention is characterized in that the source and drain electrodes of at least one field effect transistor of the series are surface regions of one conductivity type which are connected together by a channel region of one conductivity type, the gate electrode being a region of the opposite conductivity type adjoining the channel region, which region is separated from the channel region by a pn-junction.

It will be obvious that the frequencies at which the memeory can be used are also dependent upon the value of the memory capacitances. In general, according as the used frequencies are lower, the memory capacitances will have to be larger. As a result of this the said internal capacitance of the conventional field effect transistors may be too small, for example, when low frequencies are used.

In a further embodiment of a semiconductor device according to the invention the gate electrode of at least one field effect transistor of the series extends above part of the drain electrode and above the channel region. As a result of this the internal capacitance between the gate electrode and the drain electrode is effectively increased, the increase of the required surface area per memory unit being maximum.

The internal memory capacitance is increased in a different manner in an embodiment of the semiconductor device according to the invention in which within the drain electrode of at least one field effect transistor of the series a further surface region of a conductivity type opposite to that of the drain electrode is provided, which further surface region comprises a connection conductor. In this embodiment the capacitance is used of a pn-junction biased in the reverse direction, which capacitance in this case requires comperatively little extra surface area. The further surface region may be connected directly to the gate electrode of the field effect transistor through the said connection conductor.

Field effect transistors having an increased internal capacitance between the source electrode or drain electrode and the gate electrode may also be used advantageously as components, for example, in a capacitor memory in a non-integrated form or as a Miller integrator.

The invention will now be described with reference to the drawing.

Figure 3:
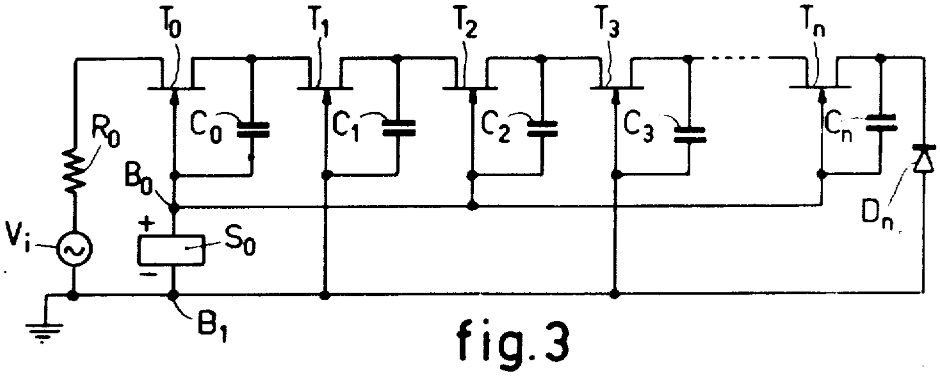
FIG. 3 shows a device which is suitable, for example, for delaying electric signals.

FIGS. 4*a*–4*d* shows the voltage variations at different points of the device shown in FIG. 3.

Figure 5:
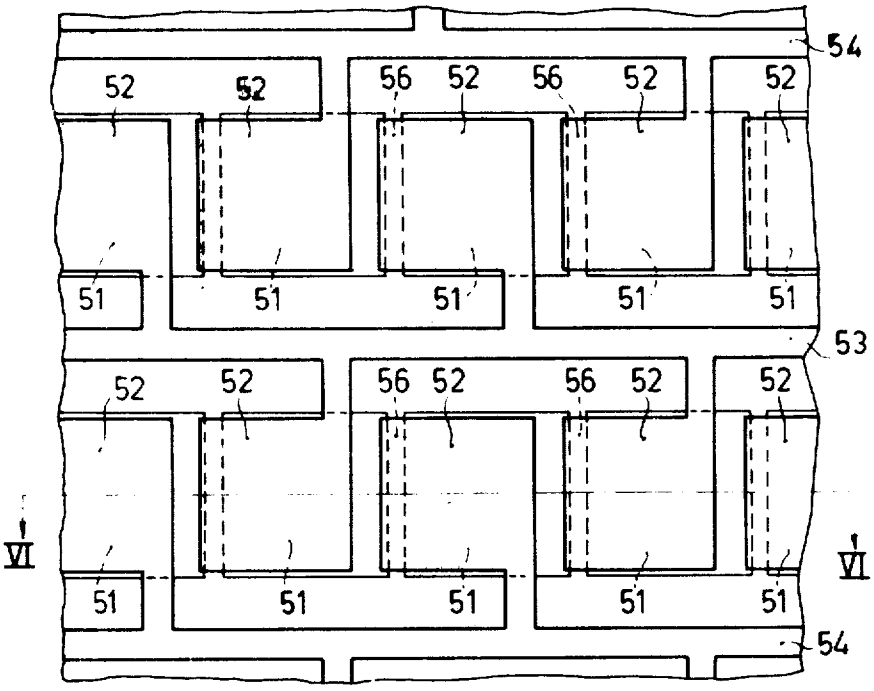
Figure 6:
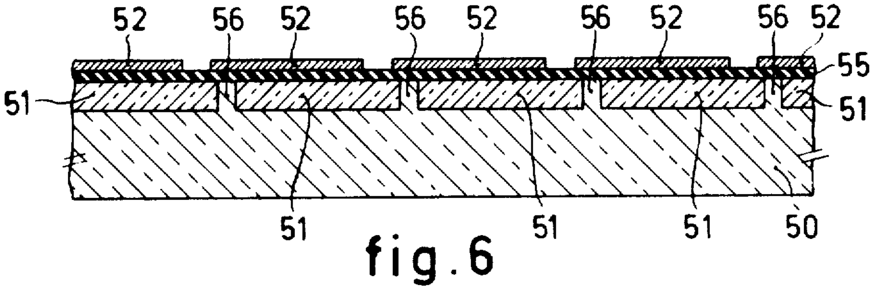

FIG. 5 diagrammatically shows a plan view of part of an embodiment of a semiconductor device according to the invention, while FIG. 6 diagrammatically shows a cross-sectional view taken on the line VI—VI of FIG. 5.

Figure 7:
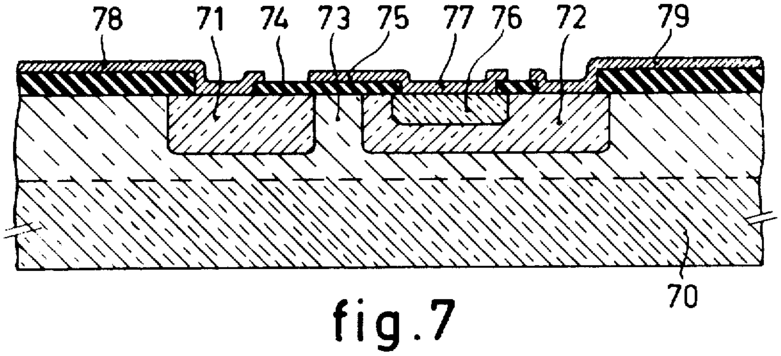
Figure 8:
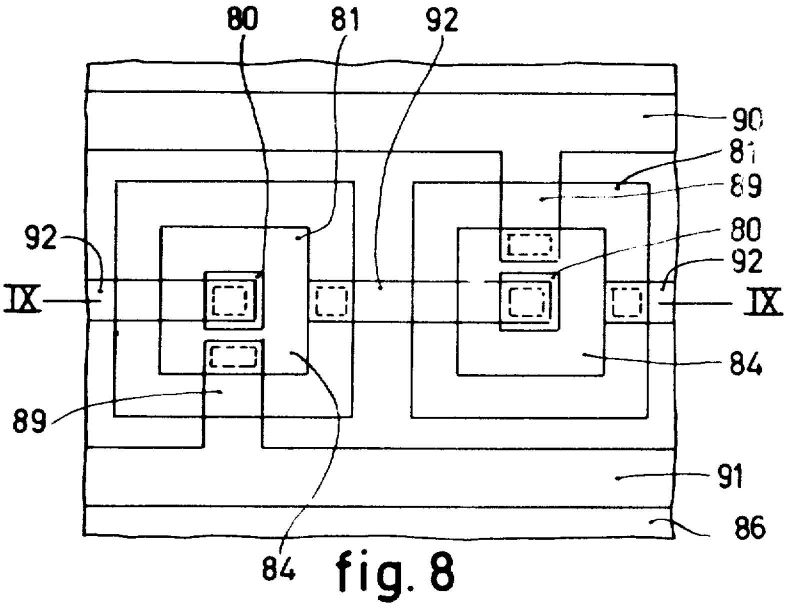
Figure 9:
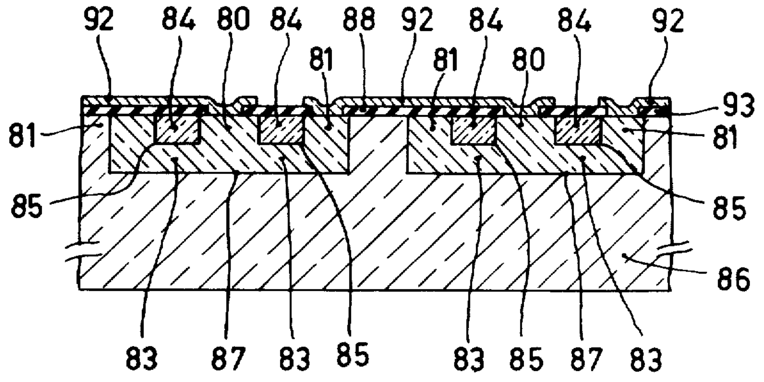

FIG. 7 diagrammatically shows a cross-sectional view of a part of another embodiment of a semiconductor device according to the invention, FIG. 8 diagrammatically shows a plan view of part of a further embodiment of a semiconductor device according to the invention, while FIG. 9 diagrammatically shows a cross-sectional view taken on the line IX—IX of FIG. 8.

Figures 10, 11:
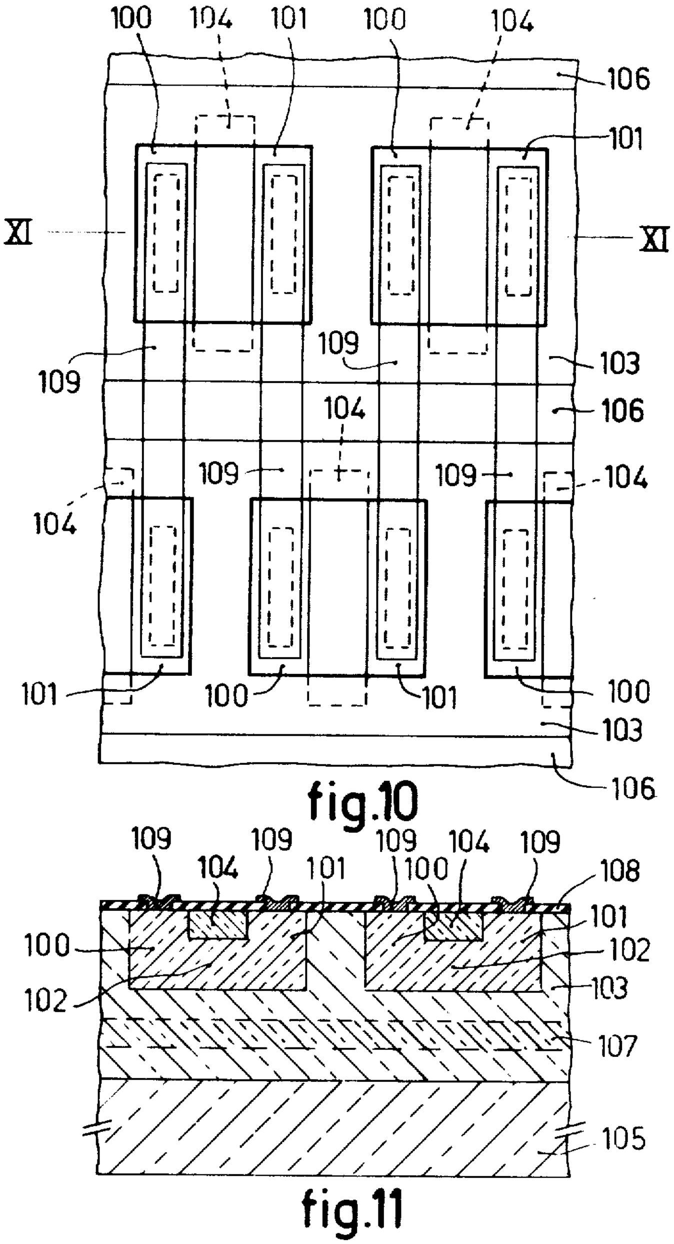

FIG. 10 diagrammatically shows a plan view of a part of another embodiment of a semiconductor device according to the invention, and FIG. 11 diagrammatically shows a cross-sectional view taken on the line XI—XI of FIG. 10.

FIG. 12 diagrammatically shows a plan view of a further embodiment of a semiconductor device according to the invention, while FIG. 13 diagrammatically shows a cross-sectional view of the semiconductor device shown in FIG. 12, taken on the line XIII—XIII of FIG. 12.

FIG. 14 shows a circuit arrangement having a transistor according to FIg. 7, in which the transistor is shown with a simple equivalent-circuit diagram.

Figure 1:
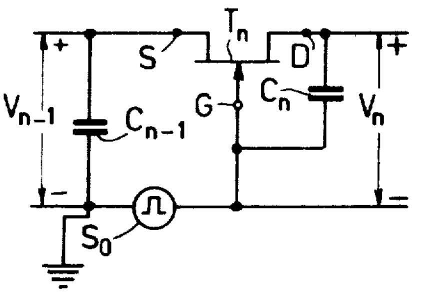
FIG. 1 shows the principal circuit diagram of the invention.
Figure 2:
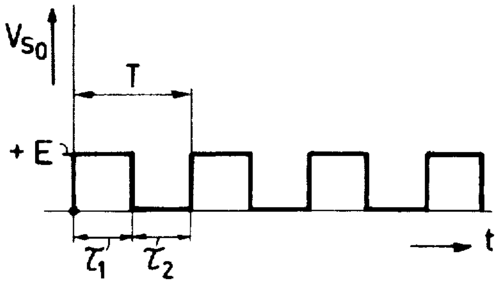
FIG. 2 shows the variation of the voltage of the switching voltage source of FIG. 1.

In FIG. 1, $T_n$ is an n-channel field effect transistor which may be constructed with an insulated gate electrode, $C_{n-1}$ is a first capacitance and $C_n$ is a second capacitance. $S_o$ is a switching voltage source which supplies an alternating voltage, for example, the form of which is shown in FIG. 2. From this latter Figure it may be seen that the voltage between the gate electrode G and a reference potential, for example, earth, is equal to positive E voltage during the time $\tau_1$, while during the time $\tau_2$ the said voltage is equal to 0 volt. The capacitance $C_n$ in FIG. 1 is provided between the drain electrode D and the gate electrode G of the field effect transistor $T_n$ operating in the enhancement mode, while the capacitance $C_{n-1}$ is connected at one end to the source electrode S and at the other end to the gate electrode of the field effect transistor $T_n$ via the switching voltage source $S_o$. During the time $\tau_1$ the voltage between the gate electrode and the reference potential is equal to E volts. The transistor will be conductive during that time of $\tau_1$ in which the voltage across the capacitance $C_{n-1}$ is smaller than $(E-V_D)$ volt, $V_D$ being the threshold voltage of the field-effect transistor $t_n$. While the transistor is conductive, current will flow through the transistor from $C_n$ to $C_{n-1}$ which will cause the voltage across the capacitance $C_{n-1}$ to increase and the voltage across the capacitance $C_n$ to decrease. If the two capacitances are of equal value, the voltage across the capacitance $C_{n-1}$ will increase in the same period to the same extent as the voltage across the capacitance $C_n$ will decrease. With a given voltage E of the switching source $S_o$ the output voltage $V_{n-1}$ across the capacitance $C_{n-1}$, which is the voltage on the source electrode, will be equal to $(E-V_D)$ volt, since upon reaching this voltage, the field effect transistor $T_n$ will become cut-off. The output voltage across the capacitance $C_n$ will consequently be equal to $(V_n - \Delta V)$ volt, where $\Delta V$ is equal to the increase in voltage across the capacitance $C_{n-1}$ and $V_n$ is the voltage across the capacitance $C_n$ at the beginning of the transfer of charge between the two capacitances. When the voltage $(E-V_D)$ volt is chosen as a reference level for the information $-\Delta V$ which was present in the capacitance $C_{n-1}$, we find that the information $-\Delta V$ has passed to the capacitance $C_n$ while simultaneously the capacitance $C_{n-1}$ has been charged to the reference level and hence is again in a condition for receiving new information from the preceding memory element. The transfer of information $- \Delta V$ is equivalent to the transfer of a quantity of charge from a first capacitance storage site $C_{n-1}$ to a succeeding capacitance storage site $C_n$.

FIG. 3 shows a chain or series circuit of $n$ units each comprising a field effect transistor in which a capacitance is arranged between the drain electrode and the gate electrode. The drain electrode of each field effect transistor is DC-connected to the source electrode of the succeeding field-effect transistor. The drain electrode of the $n^{th}$ field effect transistor is connected to the switching voltage source $S_o$ via a diode $D_n$. The output signal of the chain circuit may be derived from any drain electrode of the field effect transistors. The source electrode of the field effect transistor $T_o$ is connected to a reference potential, for example, earth, through the series arrangement of the resistor $R_o$ and the source of the input signal $V_i$. The gate electrodes of the even numbered field effect transistors are connected to point $B_o$ and, via the switching voltage source $S_o$, to a point of reference potential $B_1$ while the gate electrodes of the odd-numbered field effect transistors are directly connected to the reference potential $B_1$.

Figures 4A, 4B, 4C, 4D:
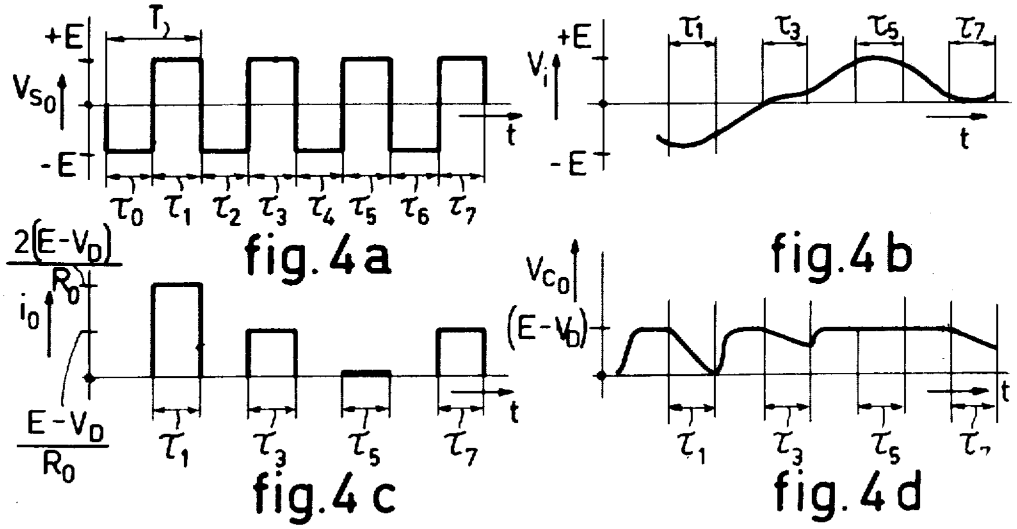

For a better understanding of the operation of the circuit arrangement shown in FIG. 3, FIG. 4 shows the most important voltage variations during the transfer operation as a function of time. Graph 4*a* shows the voltage variation of the switching source $S_o$ as a function of time. It is a symmetrical square wave voltage, having a maximum of +E voltage and a minimum of −E volt, the period of the said square-wave voltage being equal to T seconds. This period must be smaller by at least a factor 2 than the period of the highest signal frequency occurring in the input voltage $V_i$, which latter voltage is shown in FIG. 4*b*. During the even-numbered time intervals $\tau_o$, $\tau_2$, $\tau_4$ and $\tau_6$ the point $B_o$ in FIG. 3 which connects the gate electrodes of the even numbered field effect transistors has a potential of −E volt relative to point $B_1$ which connects the gate electrodes of the odd numbered field-effect transistors and which point is also connected to a reference potential. The enhancement mode N-channel transistor $T_o$ will not be conductive during the said even-numbered time intervals if the input voltage $V_i > -(E-V_D)$volt, while at the same time the even numbered transistors $T_2$, $T_4$ and so on, will not be conductive since the voltage across the odd numbered capacitances $C_1$, $C_3$, and so on, can never be larger than $(E-V_D)$ volt, as was described for the capacitance $C_{n-1}$ from FIG. 1. The odd numbered transistors $T_1$, $T_3$, and so on, will become conductive during the same even-numbered time intervals if the voltage across the even numbered capacitances $C_o$, $C_2$, and so on, is smaller than $E-V_D$ volts. The even numbered capacitances are then charged until the voltage across said capacitances has become equal to $E-V_D$ volts, while the voltage across each odd numbered capacitance will decrease to the same extent as the voltage across the preceding even numbered capacitance will increase. So in this case it is assumed that all capacitances are of the same value.

During the time in which the point $B_o$ has a voltage of +E volts relative to the point $B_1$ which is also connected to a reference potential, information regarding the value of the input signal $V_i$ is transmitted to the capacitance $C_o$ so, according to FIG. 4*a*, during the odd-numbered time intervals $\tau_1$, $\tau_3$, $\tau_5$, $\tau_7$. The value of the input signal during these time intervals is approximately equal to −E, 0, +E and 0 volts, respectively (FIG. 4*b*).

During these time intervals a current will flow through the transistor $T_0$ which is equal to $(E-V_D-V_i)/R_0+r$ amp. which causes the voltage of $(E-V_D)$volts present across the capacitance $C_0$ to decrease. The symbol $r$ denotes the differential resistance of the transistor, i.e., the inverse of its mutual conductance. The currents which flow through the transistor $T_0$ during the said time intervals are shown in FIG. 4c, while the behaviour of the voltage across the capacitance $C_0$ is shown in FIG. 4*d*. From the latter Figure it can be seen that the voltage drops across the capacitance $C_0$ vary linearly with time during the time intervals $\tau_1$, $\tau_3$, $\tau_5$, $\tau_7$ which is true only if the resistor $R_0$ is many times larger than $r$, the inverse of the mutual conductance $T_0$ of the field effect transistor $T_0$. The largest voltage drop occurs in the time interval $\tau_1$, namely $(\Delta V = E-V_D)$ volts, while the voltage drop in the interval $\tau_5$ is equal to zero volt. Thus a linear relationship between the voltage drop $\Delta V$ across the capacitor $C_0$ and the said input signal will exist only for the input signals which lie in the interval $-(E+V_D) < V_i < +(E-V_D)$ volts. The resistor $R_0$ should now be chosen to have such a value that with an input signal of 0 volts the voltage across the capacitance $C_0$ during the time that $B_0$ has a potential of +E volts relative to earth has just become equal to ½ $(E-V_D)$ volt. The mean charging current $i_{gem} = (E-V_D)/2R_0$ required therefor is determined by the value of the capacitance $C_0$ and the duration $\tau$ of each period T in which the potential of point $B_0$ is equal to +E volt. The said charging current is equal to $C_0 \cdot (E-V_D)/2\tau$ in which ½ $(E-V_D)$ is the voltage drop across the capacitance $C_0$ for an input signal of 0 volt. From this it follows that for a correct adjustment of the mean charging current it should hold that $\tau = ½\, C_0R_0$. Favorable values for the mean charging current in connection with a good signal-to-noise ratio and required switching power lie between 1$\mu$A and between 1 mA. As noted, the voltage across the first even-numbered storage capacitor $C_0$ follows the signal applied during the odd-numbered time intervals. During the even-numbered time intervals, the information voltage stored at $C_0$ (or any other even-numbered storage capacitance), as explained in connection with FIG. 1, is transferred to the succeeding odd-numbered storage capacitor $C_1$ ($C_3$, etc.) restoring reference potential to $C_0$ (and the other even-numbered capacitances). In this way, the information can propagate along the chain circuit as a voltage difference or charge quantity and be recovered at the circuit output.

Due to the fact that in the circuit arrangement shown in FIG. 3 the stray capacitances between the drain electrode and the gate electrode of the field effect transistors are now parallel to the capacitances $C_0$–$C_n$ inclusive, the presence of the said stray capacitances no longer gives rise to echo effects, since said stray capacitances now are also operative as memory capacitances. In addition, by the use of field effect transistors as switching means it is achieved that the charging current and the discharging current, respectively, of a first capacitance differs substantially not at all from the discharging current and charging current, respectively, of a second capacitance from the circuit arrangement shown in FIG. 3. In addition the use of field effect transistors has the additional advantage relative to bipolar transistors that the electric input signal $V_i$ may have a larger amplitude because the breakdown voltage between the source electrode and the gate electrode or the substrate is many times larger than the corresponding breakdown voltage between the emitter electrode and the base electrode of a bipolar transistor.

The semiconductor device shown in FIGS. 5 and 6 comprises a substrate 50 which may consist of insulating material and which may be provided with one or more surface regions of a semiconductor material, or which, as in the present example, may consist itself of a semiconductor material. According to the invention semiconductor regions 51 of a series of field effect transistors are provided in a surface region of the substrate 50, the drain electrode of a field effect transistor of the series for transferring charge being connected to the source electrode of the succeeding field effect transistor of the series in that each of the regions 51 shown constitutes both the drain electrode of one field effect transistor and the source electrode of the succeeding field effect transistor. The gate electrodes 52 are connected to one of the metal tracks 53 and 54 and thus are associated with the electric input(s) for the control signals which may be applied through said metal tracks.

The semiconductor device has a compact simple structure in which the required surface area per memory unit is small since each memory unit is constituted by one field effect transistor only. Moreover, it will be noted that the surface regions 51 of intermediate field effect transistors of the series require no direct electrical connections. In the semiconductor device depicted in FIGS. 5 and 6, the signal flow is through the semiconductor body, which acts as the storage and transfer medium, across succeeding channels 56.

Through each of the conductive tracks 53 and 54, the gate electordes 52 of a number of field effect transistors are interconnected in such manner that such number of field effect transistors comprises no two succeeding field effect transistors. As a result of this, the same control signal can be simultaneously applied to the gate electrodes of the various field effect transistors, so that a restricted number of switching voltage sources is sufficient.

In the present example the gate electrodes of the successive field effect transistors are alternately connected to the conductive track 53 and the conductive track 54. As a result of this the series of field effect transistors comprises succeeding adjacent groups having the same number of two successive field effect transistors, the gate electrodes of said transistors which are associated with various groups but have the same number in their group, being interconnected.

With this method of connecting a favorable compromise is achieved between the number of switching sources to be used on the one hand and the delay time per memory unit on the other hand. In this connection it is to be noted that the delay time per memory unit is directly proportional to the number of field effect transistors per group which simultaneously contain information.

The second or memory capacitance is constituted by the capacitance between the gate electrode 52 and the surface region 51 which are separated from each other by the insulating or dielectric layer 55 which covers the semiconductor surface. Furthermore, the gate electrode 52 is located above the channel region 56 adjoining the semiconductor surface and extending between the surface regions 51 which constitute the source and drain electrodes of the field effect transistors.

The capacitance between the gate electrode 52 and the surface region 51 is the internal capacitance between the gate electrode and the drain electrode of the field effect transistor. This internal capacitance is augmented in this case since the gate electrode 52 extends above the channel region 56 and above part of the drain electrode 51. In operation, as explained in connection with FIG. 3, the more negative (for a P-channel device) control voltage turns on, say, the even-numbered channels while the adjacent odd-numbered channels remain cut-off to prevent backflow of charge. During the next half cycle, the process is reversed, with the odd-numbered channels turned on and the adjacent even-numbered channels cut off. In this way the signal propagates unidirectionally down the chain.

It is to be noted that in field effect transistors having an insulated gate electrode of the type to which the above described field effect transistors also belong, the gate electrode usually overlaps the channel region, so that the gate electrode extends both slightly above the drain electrode and above the source electrode. In the field effect transistor described in connection with FIG. 6 which has an increased internal capacitance, the gate electrode, however, is not symmetrical relative to the channel region, so that a larger, preferably a considerably larger, part of one electrode is covered by the gate electrode than of the other electrode. As a result of this asymmetry, upon the application of the control voltages, an electric field corresponding to an asymmetrical potential well is established in the semiconductor under each electrode. Due to the surface regions 51, the leading edge of the asymmetrical potential well under the electrode to which the more negative control voltage is applied will have a greater average depth than the trailing portion. This ensures unidirectional informational carrier flow through the device. The electrodes are spaced such that the adjacent potential wells overlap during transfer before breakdown occurs in the semiconductor.

The semiconductor device shown in FIGS. 5 and 6 may be manufactured entirely in a manner which is commonly used in semiconductor technology. The substrate 50 consists, for example, of n-type silicon. The p-type regions 51, proportions, for example 40 $\mu m \times$ 40 $\mu m$, may then be provided with the conventional photoresist and diffusion methods. The width of the channel regions 56 is, for example, 6 $\mu m$. The pn-junctions between the regions 51 and the substrate 50 extend, for example, to a depth of approximately 2 $\mu m$ from the semiconductor surface. The insulating layer 55 is, for example, of silicon oxide and/or silicon nitride and below the gate electrode 52 it has a thickness of, for example, 0.1 $\mu m$. Below the conductive tracks 53 and 54 the insulating layer 55 will preferably have a larger thickness, for example, 0.5 $\mu m$, to prevent undesired channel formation. For this purpose may furthermore be used channel interruptors, for example, diffused channel interruptors. The proportions of the gate electrodes 52 are, for example, 38 $\mu m \times$ 38 $\mu$ m while the width of the conductive tracks 53 and 54 is, for example, 10 $\mu m$. They consist, for example, of Al or of another suitable electrode material, for example, Au and the thickness is, for example, 0.3 $\mu m$. The semiconductor device may be assembled in a conventional manner in a normal envelope. In this example, the transistors are P-channel devices. The signal is transferred by hole charge carriers, which are majority with respect to the P-diffusions 51 but are minority with respect to the N-substrate 50.

Another embodiment of a field effect transistor having an increased internal capacitance between the gate electrode and the drain electrode will now be described with reference to FIG. 7. This field effect transistor comprises a semiconductor body 70 in which two surface regions 71 and 72 of the same conductivity extend from the same surface, while between said surface regions 71 and 72 a channel region 73 is provided which adjoins said surface regions and the semiconductor surface. An electrode 75 extends above the channel region 73 and is separated therefrom by the insulating layer 74. According to the invention, at least one of the surface regions, in this case the drain electrode 72, in the semiconductor body 70 surrounds a further surface region 76 which is of a conductivity type opposite to that of the surface regions 71 and 72. Furthermore the surface region 76 is provided with a connection conductor 77.

In this embodiment the capacitance of the pn-junction between the regions 72 and 76 is used. It is desirable that said pn-junction in the operating condition is always biased in the reverse direction. This may be achieved by connecting a suitable voltage source between the connection conductor 77 and the gate electrode 75. In field effect transistors having a low threshold voltage, for example, the voltage between the gate electrode and the drain electrode will often be such, however, that the desired pn-junction is biased in the reverse direction also when the gate electrode 75 and the connection conductor 77 are directly connected together (as shown in FIG. 7).

In the present example, the source electrode 71 comprises a connection conductor 78 and the drain electrode 72 comprises a connection conductor 79. This field effect transistor may also be manufactured entirely in a manner conventional in semiconductor technology.

It is obvious that with a number of field effect transistors as shown in FIG. 7 a semiconductor device according to the invention may be constructed in a similar manner as is described with reference to FIG. 5. In such a device, successive field effect transistors of the series may be interconnected through conductive tracks 78, 79 or the drain electrode 72 may also constitute the source electrode 71 of the succeeding field effect transistor.

In the examples shown in FIGS. 5, 6 and 7 the substrate is provided with a connection conductor, not shown, so as to be able to bias the pn-junctions between the source and drain electrode and the surrounding semiconductor region in the reverse direction during operation. Such a connection conductor may be provided, for example, on the upper side as well as on the lower side of the semiconductor body or substrate. In the latter case a substrate 70 may advantageously be used having a low resistivity on which an epitaxial layer of the same conductivity type but with a higher resistivity is provided (FIG. 7).

Another embodiment of the semiconductor device according to the invention, a part of which is shown in FIGS. 8 and 9, comprises a series of field effect transistors in which the source and drain electrodes of at least one field effect transistor are surface regions 81 and 82 of one conductivity type which are interconnected by a channel region 83 of one conductivity type, while the gate electrode 84, 86 is a region of the opposite conductivity type adjoining the channel region 83, which region 84, 86 is separated from the channel region 83 by a pn-junctions 85, 87.

The gate electrode 84, 86 comprises two parts in which the first of said parts is a surface region 84 which, at the semiconductor surface 88 which the source and drain electrodes 80 and 81 also adjoin, surrounds one of the said last-mentioned electrodes 80 and 81, namely the electrode 80. As a result of this it can be achieved in a simple manner that the channel region 83 on the side facing the electrode 81 is wider than on the other side facing the electrode 80. This has the advantage that the internal capacitance between the region 84 and the electrode 81 is larger than the internal capacitance between the region 84 and the electrode 80.

In the semiconductor device according to the invention the electrode 80 is preferably used as a source electrode and the electrode 81 as a drain electrode, in which case the larger of the two mentioned internal capacitances serves as a second or memory capacitance. This choice of source and drain electrode has the further advantage that in the operating condition the electric field strength in the channel region 83 widening from the source electrode to the drain electrode, has a more even value so that a good operation of the field effect transistor is promoted.

In the semiconductor surface region the second part 86 of the gate electrode 84, 86 surrounds the region of one conductivity type which is constituted by the channel region 83 and the source and drain electrodes 80 and 81. The second part 86 is separated from the said region of one conductivity type by the said junction 87.

In contrast with what is normal in field effect transistors, the part 86 of the gate electrode in this embodiment of the semiconductor device according to the invention is not used as an active part of the field effect transistor. As a result of this the part 86 may constitute a surface region or a substrate in which various field effect transistors may be provided without further measures being necessary to insulate said field effect transistors from each other. The region 84 which is provided with a connection conductor 89 is used as an active gate electrode to which the control signal can be supplied through the conductive tracks 90 and 91. The substrate 86 may be connected to a reference potential through a connection conductor, not shown. The substrate may alternatively be floating, i.e. not connected to a point in the circuit as a result of which connection the potential of the substrate would be different from that without said connection.

An insulating layer 93 on which the conductive tracks 89 to 92 inclusive are provided is arranged on the semiconductor surface 88. The conductive tracks 92 each connect a drain electrode 81 of a field effect transistor of the series to the source electrode 80 of the succeeding field effect transistor of the series.

It is to be noted that the gate electrode 84 may also have a narrow annular or differently closed geometry in which, for example, a local widening is provided so as to be able to provide the gate electrode with a connection conductor. In this manner, the channel region 83 may have, at least locally, a very small length so that the resistance between the source and drain electrode may be small.

A further embodiment of the semiconductor device according to the invention, a part of which is shown in FIGS. 10 and 11, also comprises field effect transistors in which the source and drain electrodes are surface regions 100 and 101 of one conductivity type. These regions are interconnected through the channel region 102 of one conductivity type. The gate electrode is constituted by a region 103 of the opposite conductivity type adjoining the channel region 102 and by a surface region 104 which is also of the opposite conductivity type and is connected to the region 103. In this embodiment the fact is used that in the circuit arrangement the gate electrodes of several field effect transistors are interconnected. Such interconnected field effect transistors may be provided in the same region 103. The various regions 103 are isolation from each other in normal manner in that a substrate 105 of one conductivity type is used on which an epitaxial layer 103 of the opposite conductivity type is provided, while furthermore isolation regions 106 are diffused which are of one conductivity type and which extend in the substrate 105. The regions 103 are surrounded as islands by the isolation regions 106.

The regions 103 are furthermore provided with a connection conductor, not shown, through which control signals may be applied to the gate electrodes.

In order to reduce the series resistance between the gate electrodes of the various field effect transistors, the regions 103 may be provided with a low-ohmic part 107 which does preferably not adjoin the substrate 105 because otherwise the capacitance between the regions 103 and the substrate 105 becomes extra large due to the presence of the low-ohmic part 107.

The semiconductor surface is provided with an insulating layer 108 on which a pattern of conductive tracks 109 is provided, which conductive tracks contact the source and drain electrodes 100 and 101 through windows in the insulating layer. By means of the conductive tracks 109 the field effect transistors are arranged to form a series, each of the conductive tracks 109 connecting the drain electrode 101 of a field effect transistor im a region or island 103 to the source electrode 100 of a field effect transistor in another region 103.

The field effect transistors described with reference to FIGS. 10 and 11 are symmetrical in structure. This means that the internal capacitance between the gate electrode and the source electrode is approximately equally large or even larger than the internal capacitance between the gate electrode and the drain electrode. Although this does not or substantially not interfere with the good operation of the semiconductor device, field effect transistors having a asymmetrical structure are preferably used, in which the internal capacitance between the gate electrode and the drain electrode is largest. This may be achieved, for example, by replacing the field effect transistors of the device shown in FIGS. 10 and 11 by field effect transistors of which one is shown in FIGS. 12 and 13. In these FIGS. 12 and 13 corresponding elements are denoted by the same reference numerals as in FIGS. 10 and 11 for clearness' sake. In this embodiment the source electrode 100 is considerably smaller than the drain electrode 101, while the channel region 102 on the side facing the drain electrode 101 is wider than on the other side which faces the source electrode 100.

FIG. 14 shows an equivalent circuit diagram for the transistor 125 as shown in FIG. 7. The connection conductors 78 and 79 of the transistor form the connections of the source and drain electrodes, respectively, and the extra capacitance 122, constituted by the pn-junction between the regions 72 and 76, occurs between the gate electrode 75 and the drain electrode 79.

For simplicity, a short-circuit is furthermore shown between the source electrode and the substrate. It will be obvious, however, that the substrate may also be provided with a separate connection which in a circuit can be connected externally to a point of suitable potential.

It is furthermore shown in FIG. 14 how the transistor described with reference to FIG. 7 can be connected as a Miller integrator. The drain electrode 79 is connected, via a resistor 120, to a supply voltage source (not shown) while between the gate electrode 75 and the source electrode 78 an input circuit is provided which is diagrammatically shown in the Figure by the block 121. The input circuit may include a signal voltage source and, for example, a series resistance. When a square-wave voltage is applied, for example, to the input of the transistor as shown in the Figure, the integrated signal shown in the Figure can be obtained at the drain electrode, which is connected to the output.

It will be obvious that the invention is not restricted to the examples described and that many variations are possible to those skilled in the art without departing from the scope of this invention. For example, both field effect transistors having an n-type channel region and having a p-type channel region may be used. Alternatively, both field effect transistors of the enhancement type and of the depletion type may be used. Furthermore, the circuit arrangement described in FIG. 3 may advantageously be used, for example, for realizing in the conventional manner a filter for the electric signals. Furthermore, when using a great many units in, for example, the chain circuit shown in FIG. 3, charge losses, if any, may be compensated for by providing one or more conventional charge amplifiers in the chain circuit. Alternatively in combination with the chain circuit described conventional input circuits and output circuits may be used. Furthermore, two or several of said chain circuits may be connected in parallel with common input(s) and/or common output(s).

Furthermore, in field effect transistors having a gate electrode separated from the channel region by a pn-junction, the capacitance between the gate electrode and the drain electrode may be increased by using extra surface regions, which, for example, are located within a surface part of the gate electrode or entirely or partly within the drain electrode and which are connected to the drain electrode and the gate electrode, respectively.

Other semiconductor materials may also be used, for example, germanium or $A^{III}B^{V}$-compounds, while other geometries are also possible.

The channel region may be locally narrowed by providing further semiconductor regions in such manner that the channel region is first pinched off at the area of the said narrowing by the depletion layers associated with the pn-junction of the gate electrode. In this manner the pinch-off point may be displaced in the direction from the drain electrode to the source electrode so that the capacitance between the gate electrode and the source electrode is decreased in favor of that between the gate electrode and the drain electrode.

What is claimed is:

1. A charge transferring device comprising a semiconductor body having a surface, an insulating layer on the semiconductor body surface, a plurality of spaced conductive layers on said insulating layer, conductive layers of said plurality forming with underlying regions of said body and the intervening insulating layer portion a plurality of succeeding capacitive storage means, and means for applying alternating control voltages to at least some of said conductive layers for causing charge stored in a plurality of first storage means to transfer substantially only to succeeding second storage means by electric field effect in the body.

2. A charge transferring device comprising a semiconductor body having a surface, an insulating layer on the semiconductor body surface, a plurality of spaced conductive layers on said insulating layer, conductive layers of said plurality forming with underlying regions of said body and the intervening insulating layer portion a plurality of succeeding capacitive storage means, means for applying alternating control voltages during certain time intervals to at least some of said conductive layers for causing charge stored in first storage means to transfer to succeeding second storage means by inducing an electric field effect in body material intervening between the one and the succeeding second storage means, and means for applying control voltages during different time intervals to at least others of said conductive layers for causing charge stored in the second storage means to transfer to succeeding third storage means by inducing an electric field effect in body material intervening between the second and the succeeding third storage means.

3. A semiconductor device for transferring electrical charge, comprising a substrate, a plurality of spaced serially arranged semiconductor regions in the surface of the substrate, an insulating layer substantially covering all the semiconductor regions in the substrate, a plurality of spatially separated conductive gate elements overlying said insulating layer, each gate element facing portions of at least two semiconductor regions, the area between each gate element and one of the facing semiconductor regions comprising a charge storage area, and a voltage source means for providing to non-adjacent gate elements switching voltages having positive and negative excursions with respect to that provided to other gate elements whereby charges stored in non-adjacent charge storage areas are transferred to other charge storage areas of the semiconductor device.

4. A charge transferring device, comprising a plurality of field effect transistors, each having a gate and source and drain regions, the drain-source paths of all the transistors being connected to form a series circuit wherein the drain region of each transistor is connected to the source region of an adjacent transistor, a capacitive coupling intermediate the gate and the drain regions of each transistor, and switching source voltage means connected to the gates of all the transistors for alternately switching alternate transistors of the series connected plurality of transistors, whereby charge is transferred between the capacitive coupling of adjacent transistors in the series.

5. A semiconductor device as claimed in claim 4, wherein the gates of alternate field effect transistors of the series are interconnected.

6. A semiconductor device as claimed in claim 5, wherein the series of field-effect transistors comprises at least two succeeding groups adjoining each other and having the same number of succeeding field-effect transistors, the gates of said field-effect transistors which are associated with various groups and have the same corresponding number in their group being interconnected.

7. A charge transferring device as claimed in claim 4, wherein the transistors of the device are arranged in surface regions of a semiconductor material on a substrate, the drain regions of the field-effect transistors of the series being connected to the source region of the succeeding field-effect transistor of the series, and wherein the capacitive coupling between the gate and the drain regions comprises the internal capacitance between the gate and the drain region of each field-effect transistor.

8. A semiconductor device as claimed in claim 7, wherein the source and drain electrodes of one or more field-effect transistors of the series are surface regions, while between said surface regions a channel region extends which adjoins the semiconductor surface and which is bounded by the surface regions, and further comprising an insulating layer on the semiconductor surface on which layer the gate is provided which extends above the channel region.

9. A semiconductor device as claimed in claim 8, wherein the drain electrode of at least one field effect transistor of the series also constitutes the source electrode of the succeeding field effect transistor of the series.

10. A semiconductor device as claimed in claim 8, wherein the gate of at least one field-effect transistor of the series extends above the channel region and above part of the drain electrode so as to increase the internal capacitance between the gate and the drain electrode.

11. A semiconductor device as claimed in claim 8, wherein in the drain electrode of at least one field effect transistor of the series, a further surface region of a conductivity type opposite to that of the drain electrode is provided, said further surface region comprising a connection conductor.

12. A semiconductor device as claimed in claim 11, wherein the further surface region is connected to the gate of the said field effect transistor through the said connection conductor.

13. A semiconductor device as claimed in claim 7, wherein the source and drain electrodes of at least one field effect transistor of the series are surface regions of one conductivity type which are interconnected by a channel region of one conductivity type, the gate being a region of the opposite conductivity type adjoining the channel region, which region is separated from the channel region by a pn-junction.

14. A semiconductor device as claimed in claim 13, wherein the channel region of the said field effect transistor on the side facing one of the two electrodes of one conductivity type is wider than on the other side facing the other of the said two electrodes.

15. A semiconductor device as claimed in claim 13, wherein the gate of the said field effect transistor comprises two parts in which a first of said parts is a surface region which, on the semiconductor surface which the source and drain electrodes also adjoin, surrounds one of the two last mentioned electrodes.

16. A semiconductor device as claimed in claim 15, wherein the second part of the gate in the semiconductor surface region in which the field effect transistor is provided surrounds the region of one conductivity type which is constituted by the channel region and the source and drain electrodes.

17. A semiconductor device as claimed in claim 15, wherein the first part of the gate is provided with a connection conductor.

18. A circuit arrangement comprising a field effect transistor, comprising a semiconductor body having a drain region and a source region of the same conductivity type extending from a surface, the semiconductor body having a channel region adjoining both drain and source regions and extending to the surface, an insulating layer extending above the channel region, a gate electrode on the insulating layer, a further surface region of a conductivity type opposite to that of the drain and source regions nested in the drain region of the field effect transistor to form with the latter a gate-drain additional capacitance, and a conductor connecting the further surface region to the gate electrode, said circuit including means for biasing the drain in the reverse direction relative to the body.

19. A circuit arrangement as claimed in claim 18, wherein a first capacitance is included in the source electrode circuit of the field effect transistor, a source of switching voltage is provided between the gate electrode and the first capacitance remote from the source electrode, whereby charge is transferred from the first capacitance to a second capacitance which is provided between the drain and the gate electrode and which includes the pn-junction between the drain region and the further surface region, the transfer of charge being controlled by the source of switching voltage.

20. A circuit arrangement as claimed in claim 18, wherein the drain electrode is connected to a supply voltage source via an impedance while between the gate electrode and the source electrode an input circuit is provided and output signals are derived from the drain electrode.

21. A device as set forth in claim 1 wherein at least a plurality of said underlying regions of said body forming parts of said capacitive storage means being free of any direct electrical contacts to said regions.

22. A device as set forth in claim 1, and including means for maintaining other conductive layers at a potential preventing charge transfer to the storage means preceding said first storage means whenever a control voltage is applied to said some of said conductive layers to cause charge transfer to the second storage means.

23. A charge storage and transferring device, comprising a semiconductor body having a surface, an insulating layer on the semiconductor body surface, spaced conductive means on said insulating layer and forming with spaced underlying regions of said semiconductor body and the intervening insulating layer portion successive capacitive charge storage stages, each of a plurality of said charge storage stages forming with a preceding stage in the body a first charge transfer path and also forming with a succeeding stage in the body a second charge transfer path, means for applying potentials to said conductive means to turn on the second charge transfer paths thereby to cause the charge condition stored in each of said plurality of charge storage stages to be transferred to the succeeding stage, and means for preventing turn-on of the first charge transfer paths when the second charge transfer paths are turned-on.

24. A device as set forth in claim 23 wherein means are coupled to one of the charge storage stages for establishing a charge condition therein corresponding to an input signal applied to said means, and means are coupled to a subsequent charge storage stage for deriving an output signal corresponding to the charge condition thereof, the semiconductor body regions of the charge storage stages in the charge transfer path between said one and said subsequent charge storage stages being free of any direct electrical connection to the input or output signals.

25. A device as set forth in claim 24 wherein means are provided for interconnecting a first plurality of non-adjacent conductive means of the plurality of successive storage stages, and means are provided for interconnecting a second plurality of non-adjacent conductive means of the said plurality of successive storage stages.

26. A device as set forth in claim 23 wherein the conductive means of each of a plurality of charge storage stages is asymmetrical with respect to the underlying semiconductor body region of its stage.

27. A device as set forth in claim 1 and further comprising means for applying control voltages to others of said conductive layers for causing charge stored in the second storage means to transfer by electric field effect in the body substantially only to succeeding storage means.

28. A device as set forth in claim 27, wherein the succeeding storage means receiving charge from the second storage means constitutes at least some of the first storage means, and none of the conductive layers of the storage means to which the same control voltages are simultaneously applied are adjacent to one another.

29. An integrated semiconductor device comprising a common semiconductor body having a surface, an insulating layer on the surface, a plurality of spaced conductive layers on said insulating layer; said conductive layers forming with underlying surface regions of the body and the intervening insulating layer portions a series of charge processing stages including an input stage for storing a charge whose magnitude depends upon the magnitude of an applied signal, an output stage from which a signal may be derived whose magnitude depends upon the charge transferred to it, and a plurality of charge storage stages serially connected between the input and output stages for receiving a charge condition from a preceding stage and storing same for a certain time interval; and means in response to applied control voltages for inducing charge transfer paths in the semiconductor body adjacent to the surface between non-adjacent pairs of charge storage stages so as to cause the applied signal to propagate through the series of stages from input to output in the form of discrete quantities of charge.

30. A device as set forth in claim 29 and including means for forming a depletion layer underlying the surface regions of the semiconductor body which form part of the charge processing stages.

31. A device as set forth in claim 29 wherein the applied signal contains at least three different magnitude values, and each of the charge storage stages is capable of storing at least three different charge mangitudes.

32. A device as set forth in claim 29 wherein the charge storage stages are divided into at least first and second groups, means are provided for applying the same control voltage to the conductive layers of the first group for a certain time interval, and means are provided for applying the same control voltage to the conductive layers of the second group for a different time interval, both said time intervals being of the same duration.

33. An integrated semiconductor device comprising a common semiconductor body having a surface, an insulating layer on the surface, a plurality of spaced conductive electrodes on said insulating layer, said conductive electrodes forming with underlying surface regions of the body and the intervening insulating layer portions a series of charge processing stages including a plurality of serially connected charge storage stages for storing a charge condition representing a signal for a certain time interval, said charge storage stages including at least first and second groups of plural charge storage sites within the semiconductor body with at least one site of each group being coupled via the semiconductor body to a preceding site of another group and to a succeeding site of another group, means responsive to applied control voltages to at least some of the conductive electrodes during a first time interval to lower the potential for charge carriers of semiconductor body regions between each thus coupled storage site of the first group and the succeeding other group storage sites and simultaneously maintain higher the potential of semiconductor body regions between the same storage sites of the first group and the preceding other group storage sites to cause the charge conditions stored in said same first group sites to transfer via the semiconductor body to succeeding other group sites only, and means responsive to applied control voltages to at least some of the conductive electrodes during a second time interval to lower the potential for charge carriers of semiconductor body regions between thus coupled other group storage sites and the succeeding first group storage sites and simultaneously maintain higher the potential of semiconductor body regions between the same other group storage sites and preceding storage sites to cause the charge conditions stored in said same other group sites to transfer via the semiconductor body to succeeding first group sites only, whereby the signal can be caused to propagate in one direction through the series of stages in the form of discrete charge quantities.

34. A device as set forth in claim 33 wherein the means responsive to applied control voltages to cause charge transfer from first group storage sites to succeeding other group storage sites causes the first group storage sites on or before termination of the first time interval to assume a reference charge condition for receiving a new charge condition during the second time interval.

35. A device as set forth in claim 34 wherein the first and second time intervals are of equal duration and the applied control voltages are periodic in nature.

36. A device as set forth in claim 34 wherein the means responsive to applied control voltages comprises positioning of the electrodes asymmetrically with respect to the storage sites.

37. A charge transferring device comprising a semiconductor body having a surface, an insulating layer on the semiconductor body surface, a plurality of spaced conductive electrodes on said insulating layer, conductive electrodes of said plurality forming with underlying regions of said body and the intervening insulating layer portion serially-arranged capacitive storage sites in the body, means for establishing a reference charge condition in at least a plurality of first storage sites which are non-adjacent to one another, means for varying the charge condition of at least one of the said first storage sites to represent a signal, and means in response to applied control voltages to at least some of said conductive electrodes for causing signal-representative charge when stored in said first storage sites to transfer substantially only to succeeding second storage sites in the serial arrangement by electric field effect in the body and for simultaneously substantially restoring the reference charge condition in said first storage sites upon termination of the charge transfer.

38. A charge transferring system comprising a plurality of succeeding insulated gate field-effect transistors each having gate, source and drain, means connecting the drain-source paths of all the transistors in series whereby the drain of each said transistor is coupled to the source of the succeeding transistor, capacitive means connected between the gate and drain of each transistor of the series, and switching voltage means connected to the gates of all the transistors and operative to turn-on first a group of non-adjacent transistors of said series connected transistors to transfer charge between a first group of non-adjacent capacitive means and other capacitive means and operative at a subsequent time to turn-on another group of non-adjacent transistors of said series-connected transistors to transfer charge from said other capacitive means.

39. Information storage and transfer apparatus of the type adapted for storing and sequentially transferring mobile charge carriers coupled to locally induced potential energy minima within suitable storage media comprising: a storage medium; a dielectric layer disposed over the storage medium; two sets of electrodes disposed over the dielectric layer, each set including a plurality of electrodes, and the electrodes of the two sets being interleaved a pair conduction paths, each electrode of one set being electrically coupled to a common one of the pair of conduction paths, and each electrode of the other set being electrically coupled to the other of the pair of conduction paths; and the sets of electrodes being adapted and disposed realtive to the storage medium such that upon application of sufficient operating voltages to the pair of conduction paths a plurality of asymmetrical potential wells are formed, separate ones of the potential wells being formed at least under each of the electrodes of one of the sets of electrodes, the asymmetry being such that relative to the desired direction of advance of stored mobile charge the leading portion of the potential well has a greater average depth than the trailing portion of the potential well.

40. The improvement of claim 38 wherein the electrodes are sufficiently closely spaced that adjacent potential wells overlap at some applied voltage less than that required to induce avalanche breakdown in the semiconductive wafer so that the stored charge can be transferred from one potential well to the one next adjacent in the desired direction.

41. The improvement of claim 39 in combination with input means for injecting minority carriers into at least one of said potential wells, said injected carriers representing signal information, and output means for detecting the presence of said minority carriers at some other potential well.

42. In information storage and transfer apparatus of the type including a storage medium over which there is disposed a dielectric layer and over which dielectric layer there is, in turn, disposed a plurality of sets of electrodes, each set including a plurality of electrodes, to which voltages can be applied sequentially for causing a succession of potential wells in which quantities of mobile charge can be stored in accordance with signal information and between which the stored charge can be transferred unidirectionally, the improvement for achieving unidirectional advance therethrough which comprises: a pair of conduction paths, every second electrode of said plurality of sets of electrodes being coupled to a common one of the pair of conduction paths and the remaining electrodes of said plurality of sets of electrodes being coupled to the other one of the pair of conduction paths; and means in response to sufficient voltages applied to the conduction paths for causing under each electrode the formation of an asymmetrical potential well, the asymmetry being such that relative to the desired direction of advance of stored mobile charge the leading portion of the potential well has a larger average depth than the trailing portion of the potential well.

43. Apparatus as recited in claim 42 wherein adjacent electrodes are sufficiently closely spaced that the depletion regions formed thereunder intersect each other at some applied voltage less than that required to induce avalanche breakdown in the semiconductive body.

44. Apparatus as recited in claim 42 additionally comprising means for injecting excess minority carriers into at least one of the potential wells.

45. A method of operating semiconductor apparatus for storage and sequential transfer of mobile charge carriers representing signal information and which comprises:

a semiconductive body having a surface;

a plurality of localized conductive electrodes disposed over the body and each separated therefrom by a barrier layer and defining in the semiconductive body a plurality of localized storage sites for mobile charge carriers and forming in the body a path between an input portion and an output portion, and wherein the method of operation comprises:

applying signals to the input of the apparatus sufficient to cause variations in the quantity of mobile charge carriers in the input portion, said variations representing signal information; and applying to the electrodes alternating control voltages sufficient to cause the advance of substantially all of said signal-representing mobile carrier quantity variations from each storage site through the semiconductive body to the next storage site along the path at each alternation of the voltages.

* * * * *

UNITED STATES PATENT AND TRADEMARK OFFICE

CERTIFICATE OF CORRECTION

PATENT NO. : 3918081

DATED : November 4, 1975

INVENTOR(S) : FREDERIK LEONARD JOHAN SANGSTER

It is certified that error appears in the above-identified patent and that said Letters Patent are hereby corrected as shown below:

Column 1, line 45, delete "in" (first occurrence).

Column 2, line 32, before "second" insert -- a --.

Column 4, line 20, change "memeory" to -- memory --.

Column 5, line 21, change "FIg" to -- FIG. --.

line 31, change "voltage" to -- volts --.

Column 7, line 14, delete "To".

Column 19, line 28, after "interleaved" insert a semi-colon (;) ; after "pair" insert -- of --.

line 33, change "realtive" to -- relative --.

line 44, change "38" to -- 39 --.

Signed and Sealed this

*second* Day of *March 1976*

[SEAL]

*Attest:*

RUTH C. MASON
*Attesting Officer*

C. MARSHALL DANN
*Commissioner of Patents and Trademarks*